United States Patent [19]
Abelitis et al.

[11] Patent Number: 4,469,664
[45] Date of Patent: Sep. 4, 1984

[54] METHOD FOR REDUCING THE CONCENTRATION OF SULFUR COMPOUNDS IN A SYSTEM FOR CALCINING FINE GRAINED MATERIALS

[75] Inventors: Andris Abelitis, Rösrath; Jakob Hinterkeuser, Augustin, both of Fed. Rep. of Germany

[73] Assignee: Klöckner-Humboldt-Deutz AG, Fed. Rep. of Germany

[21] Appl. No.: 484,980

[22] Filed: Apr. 4, 1983

[30] Foreign Application Priority Data

Apr. 28, 1982 [DE] Fed. Rep. of Germany ....... 3215793

[51] Int. Cl.$^3$ .......................... B01J 8/00; C01B 17/00; C04B 7/02; F27B 15/00
[52] U.S. Cl. ..................................... 423/244; 422/62; 106/100; 106/103; 432/14
[58] Field of Search .......... 423/242 A, 242 R, 244 A, 423/244 R; 422/62; 106/100, 103; 432/14

[56] References Cited

U.S. PATENT DOCUMENTS

| 4,047,884 | 9/1977 | Heian | 423/242 R |
| 4,276,272 | 6/1981 | Schlager et al. | 423/244 |
| 4,322,224 | 3/1982 | Roth | 423/244 X |
| 4,324,759 | 4/1982 | Aoki et al. | 422/62 |

Primary Examiner—Gregory A. Heller
Attorney, Agent, or Firm—Hill, Van Santen, Steadman & Simpson

[57] ABSTRACT

A method and apparatus for reducing the sulfur content and/or the $SO_2$ emission in a system for calcining fine grained materials such as in the manufacture of cement utilizing a pre-calcining and a final calcining stage. The sulfur content of a process gas or of a material stream is determined and then is mixed with appropriate amounts of a dust or a raw meal in a reaction zone, the dust or raw meal containing sulfur bonding substances such as alkaline earth carbonates. The exhaust gas from which the sulfur compounds are removed by the sulfur bonding is separated from the sulfur containing solids and the exhaust gas and solids are removed from the calcining system.

5 Claims, 2 Drawing Figures

METHOD FOR REDUCING THE CONCENTRATION OF SULFUR COMPOUNDS IN A SYSTEM FOR CALCINING FINE GRAINED MATERIALS

BACKGROUND OF THE INVENTION

1. Field of the Invention

This invention is in the field of calcining fine grained materials such as cement meal wherein sulfur compounds and sulfur dioxide are monitored and reacted with sulfur bonding substances in predetermined amounts to produce an exhaust gas which is relatively free of sulfur compounds and solids which contain the reaction products.

2. Description of the Prior Art

The formation of injurious material concentrations of sulfur compounds in the circulation of products through various material conversion systems is frequently a severe problem. For example, the concentration of alkali or sulfur compounds occur quite frequently in calcining installations for the manufacture of cement and often lead to the formation of injurious incrustations.

Sulfur, for example, occurs in sulfidic or sulfate compounds of the raw meal which contains calcium carbonate, the raw meal being calcined into clinker in the normal process to use of suspension type gas preheaters and rotary tubular kilns. As a result of the temperatures occurring in the system, which may be around 1400° C. in the clinker zone, sulfur compounds are dissociated while liberating $SO_2$ into the process gas. Further amounts of $SO_2$ may be introduced into the system through the use of sulfurous fuels.

Sulfur dioxide produced in the hot gases of the calcining system reacts with the alkali and alkaline earth compounds contained in the raw meal to form alkali sulfates. For example, potassium oxide resulting from the presence of silicate compounds of the minerals of the raw meal reacts with sulfur dioxide according to the equation:

$$K_2O + SO_2 + \tfrac{1}{2}O_2 = K_2SO_4$$

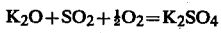

Since alkali metal sulfates have low vapor pressures, these sulfates are discharged from the calcining system together with the clinker.

A portion of the sulfur dioxide present reacts with lime components which have been deacidified from the calcium carbonate form to calcium oxide and thereby form calcium sulfate or gypsum. At temperatures less than about 1000° C., the equilibrium tends to the formation of calcium sulfate and calcium sulfide. At temperatures in excess of about 1000° C., the reaction tends to the formation of calcium oxide and sulfur dioxide. The overall reaction can be represented as follows:

$$4CaO + 4SO_2 \rightleftarrows 3CaSO_4 + CaS$$

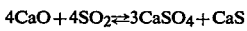

Calcium sulfate, however, is not stable at temperatures above 1000° C. but dissociates in the clinker zone at approximately 1400° C. to form CaO and $SO_2$. The sulfur dioxide thereby liberated appears in the gases of the calcining system and forms the primary cause for the formation of sulfur circulations (Walter H. Duda, Zement-Data-Book, 2nd Edition, 1977, Bauverlag GmbH, Wiesbaden and Berlin; McDonald and Evans, London, Page 6, 1.4.3: Schwefel; Reprint from the periodical "Zement-Kalk-Gips" (ZKG), Bauverlag GmbH, Wiesbaden, 1960, pages 36 through 44: Weber "Wärmevorgänge im Drehofen unter Berücksichtigung der Kreislaufvorgänge und Phasenbildung").

A balanced sulfur concentration within a calcining system wherein the intake of sulfur from the raw meal and fuel as well as loss in the clinker zone, dust, and allowable concentrations of exhaust gas are in a state of equilibrium can be achieved only with great difficulty, in view of the multitude of influences on the raw material side and because of the variable reaction determining parameters. The formation of internal dust circulation also plays a part since the meal circulation can, for example, achieve 1.5 to 2 times the amount of delivered meal in the lowest heat exchanger stage.

Under some conditions, dust and material circulations can interact when the original flow is disrupted due to incrustations or lining damage, particularly in the meal intake portion and as a result, displacements in the intended temperature zones also occur.

As a result, continued circulation can lead to extremely high built-up concentrations of compounds at individual locations of the calcining system even though these materials are present in only small amounts in the raw material or in the fuel.

In the case of sulfur, circulation of appreciable concentrations causes undesired incrustation formations, caused by eutectics in the range from 800° to 1000° C. within a suspension type heat exchanger. This reduces the output of the system and may possibly lead to operating disruptions. Thus, when the concentration of $SO_2$ which cannot be reduced to a sufficient degree by means of sulfate formation appears in the gas stream of the suspension type heat exchanger, the $SO_2$ emission of the exhaust gas of the installation may increase far above the allowable limits of, for example, 200 to 250 ppm to 1000 to 1500 ppm.

SUMMARY OF THE INVENTION

The present invention provides a method and an apparatus for reducing sulfur circulation and/or $SO_2$ emission in a system for calcining fine grained materials to prevent the creation of injurious circulation concentrations of sulfur within the system and an excessive amount of $SO_2$ in the exhaust gas of the system. The method and apparatus of the present invention does not detract from the economic feasibility of the installation in terms of energy consumption.

In keeping with the present invention, the $SO_2$ content in the process gas of the final calcining stage and/or the $SO_3$ content in the hot meal is determined and is introduced into a reaction zone where it is reacted with dust containing calcium carbonate and/or magnesium carbonate which act as sulfur bonding agents. The process gas removed from the system is cooled by adding fresh air and/or water and the desulfurated process gas is separated as an exhaust gas from the solids, whereupon exhaust gas and solids are removed from the calcining system.

By removing a partial stream of hot process gas which is highly enriched from sulfur dioxide from the final calcining stage and reacting it with a dust containing carbonate in controlled amounts, there is provided a highly advantageous and uncomplicated means for reducing the sulfur component in the gas stream and/or the material stream of the system. This results in regulating the equilibrium in the sulfur balance such that the creation of injurious sulfur concentrations and the formation of incrustations or excessively high exhaust gas concentrations can be kept under control.

In a particularly preferred embodiment of the present invention, dust which arises in the system or a preheated raw meal arising in the pre-calcining stage is employed as the reactant for the sulfur bonding. Such finely dispersed dusts which, for example, can be collected in a dust separator offer significantly larger adsorption surfaces than ordinary ground raw meal, so that the reactions with sulfur can be achieved with relatively high efficiencies.

Another preferred embodiment provides for reaction of the dust with the gas utilizing a relatively high dwell time in the reaction zone. To accomplish this improvement, fine dust arising in the separation of desulfurated process gas and sulfurous solids is at least partially recirculated into the reaction zone. Because of the extended dwell time and the intimate contact, components which have not been completely reacted are provided with the possibility of a complete or nearly complete reaction. The effectiveness of the reaction result is thus improved with the advantage that the amount of dust and/or raw material approaching the stoichiometric amounts is required for sulfur bonding.

In one feature of the present invention, the dust used for the reaction is separated from a multi-chamber electric precipitation filter, the fine dust being collected preferably in the second or third chamber and having a grain size up to 40 microns, and preferably between 5 and 20 microns.

The sulfur bonding reaction is carried out at a temperature in the range from about 500° to 1000° C. and the process gas for dust precipitation is cooled to a temperature range on the order of 400° C. or less.

Optimum conditions for bonding $SO_2$ to the dust and/or raw meal are obtained as a result of the interactions of the improved process conditions. Maximum efficiencies of conversion which go beyond those anticipated are thereby achieved.

One of the advantages of the present invention is that the desulfurated process gas can be supplied as a drying gas to the drier of the system for processing and drying the feed material. Without the intensive removal of excess sulfur from the exhaust gas, the use of such exhaust gases in the flow drier would result in an injurious enrichment of the sulfur circulation. Valuable thermal emergy would be lost since the exhaust gas would have to be diluted with fresh air and the capacity of the dust removal system would have to be increased. Consequently, the capital and operating costs and the power requirements would increase significantly, thereby increasing the overall operating costs.

The suppression of injurious circulation of sulfur is of great advantage because it enables an extensive exploitation of the thermal energy contained in the gas circulation by means of drying and preheating the feed material without the consequence of excessive $SO_2$ and/or $SO_3$ concentrations.

In order to increase the thermodynamic efficiency of the reaction between the alkaline earth compounds and sulfur dioxide, any known activating material can be advantageously reduced into the reaction zone either in powder form or in solution in water by means of a jet.

The calcining apparatus of the present invention includes at least one suspension type heat exchanger with a dust separator at the exhaust gas side and a rotary tubular kiln. There is provided a chamber which is connected to the kiln intake which has at least one device for the introduction and metered delivery of dust and/or raw meal into the chamber. An exhaust gas line is connected to the chamber and includes means for the introduction of fresh air and/or water. An electric filter system is provided in the exhaust gas line and, downstream of the filter, there is a controllable exhaust means such as a variable blower together with a conveying means for supplying dust and/or raw meal to the feeder means.

The apparatus outlay provided with the present invention is relatively low since it is a matter of removing a relatively low volume of process gas from the system. Correspondingly small dimensions and favorable costs can thus be achieved.

To control the amount of process gas to be branched off based upon the amount of $SO_3$ concentration in the hot meal or the amount of dust and/or raw material based on the amount of $SO_2$ in the process gas is advantageous because it is uncomplicated. A device for measuring the $SO_2$ concentration in the gas can be disposed in the area of the exhaust gas line connected to the chamber and a device for measuring the $SO_3$ content can be disposed in the area of the down pipe for hot meal passing from the lowest cyclone of the preheater to the kiln intake. These measuring devices can be connected with signal lines to control installations which, form a control loop or circuit. By this arrangement of control engineering devices, the sulfur content in the gas and/or material stream is held to a constant level and only as much processed gas and/or dust or raw meal is diverted for sulfur bonding as is required for governing the equilibrium in the sulfur balance of the system.

BRIEF DESCRIPTION OF THE DRAWINGS

The invention is further explained in greater detail on the basis of a sample embodiment which is shown somewhat schematically in the drawings in which.

DESCRIPTION OF THE PREFERRED EMBODIMENTS

Figure 1:
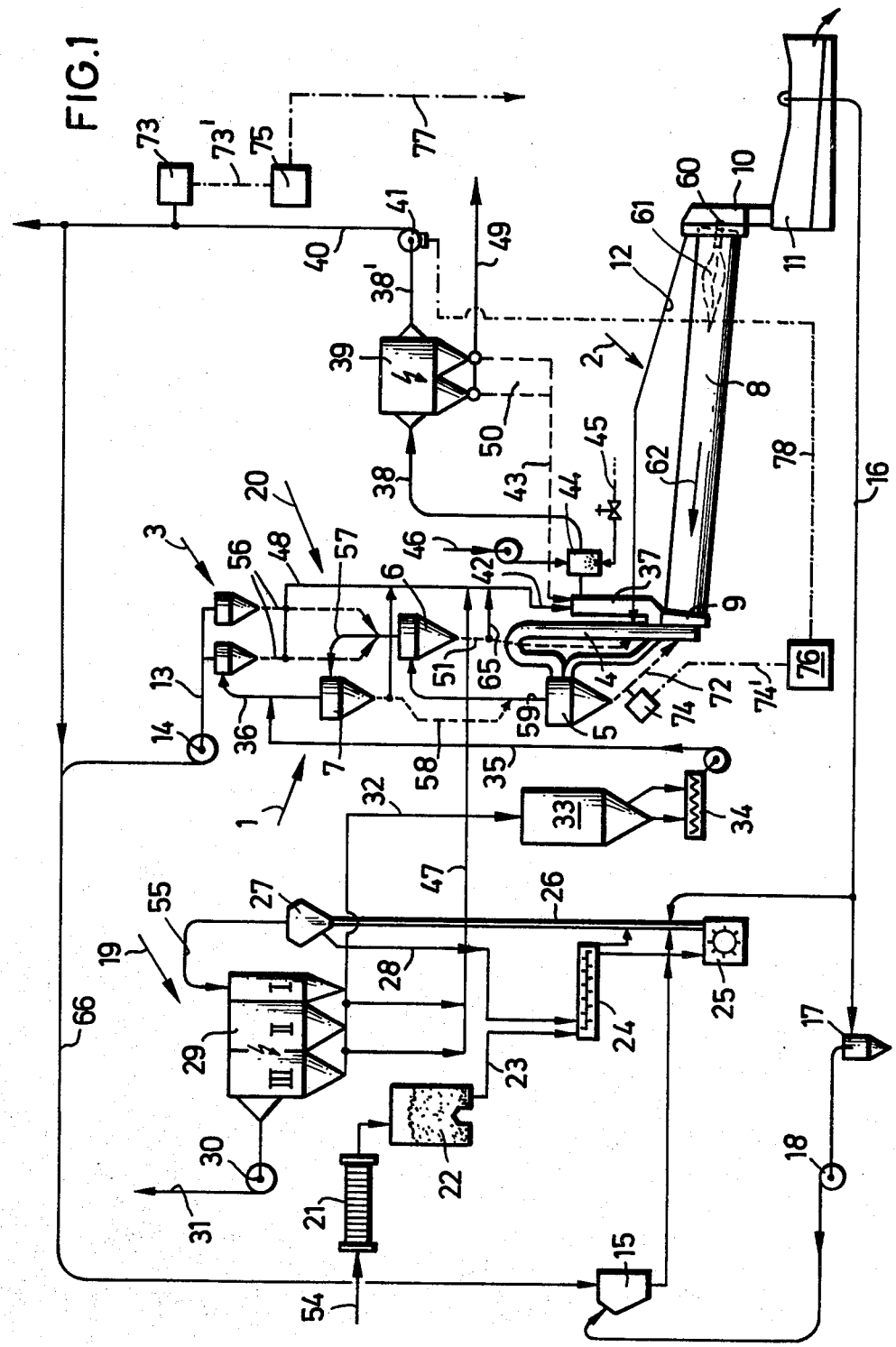
FIG. 1 illustrates a calcining system utilizing the improvements of the present invention.

The cement calcining system of FIG. 1 includes a preheating and pre-calcining stage generally indicated at reference numeral 1 and a final or finishing calcining stage generally indicated at reference numeral 2, together with a cyclone dust separator group indicated at reference numeral 3. The preheating and pre-calcining stage 1 includes a reaction zone 4 for calcining the heated raw meal and three heat exchanger cyclones 5, 6 and 7 following in the gas stream. The final calcining stage 2 comprises a rotary tubular kiln 8 having a kiln intake head 9, a kiln discharge chute 10 and being connected to a cooler 11. As is customary, a tertiary air conduit 12 conducts hot air from the cooler 11 to the rotary tubular kiln 8 directly into the reaction zone 4. An exhaust gas line 13 having an exhaust blower 14 disposed therein leads from the group of cyclone separators 3 to a mixing chamber 15 into which a line 16 extending from a center chamber of the cooler 11 discharges. The line 16 conducts preheated fresh air into the mixing chamber 15 after passage through a separator 17 and a booster blower 18.

A raw meal processing system generally indicated at reference numeral 19 is connected to the calcining system 20 for processing the raw meal intended for the calcining system 20. Included is a dewatering filter 21, an intermediate hopper 22, a conveying means 23 and a kneading mixer 24 which feeds a comminution means such as a grinder 25. A flow drier 26 is connected to the grinder 25 and delivers material to a sifter 27 having a grit return conduit 28. The drier also feeds an electric gas cleaning system 29 to which there is connected an exhaust blower 30 and an exhaust gas line 31. Finished product arising in the gas cleaning system 29 is conducted by the conveying means 32 to a supply silo 33 and is delivered from the silo over a conveyor 34. The conveyor 34 may be of the Fuller-Kinyon type in which pulverized material is transported in the form of a gas suspension. A conduit 35 connects the conveyor 34 into a line 36 which extends between the heat exchanger cyclone 7 and the cyclone dust separator group 3 of the calcining system 20.

In accordance with the present invention, in the calcining system 20 there is provided a chamber 37 with an exhaust gas line 38 forming the reaction zone, together with an electric gas cleaning apparatus 39. An exhaust blower 41 is disposed in the exhaust gas stream 38' and feeds a line 40 for disposing of desulfurated exhaust gas. Further included in connection with the chamber 37 are devices 42 and 43 for conveying and distributing dust or raw meal recovered from the glass cleaning systems 29, 39 and, under certain conditions, in the cyclone group 3 into the chamber 37. There is further provided a gas mixing chamber 44 having a device 45 for injecting water and a device 46 for supplying fresh air. A conveying means 47 is provided by means of which dust which arises in chambers II and III of the multi-chamber electric gas cleaning system 29 is transported to the distributor means 42. Similarly, a branch line 48 from the raw meal discharge of the heat exchanger cyclone group 3 is connected to the device 43 for conveying and distributing into the chamber 37. The discharge of the sulfate-containing dust separated out of the process gas by the electric gas cleaning device 39 is accomplished by a conveying device 49. A branch 50 serves for recirculation of deposited dust and introduction back into the chamber 37 through the device 43.

A sensing device 73 is provided in the line 40 for measuring the SO$_2$ content of the desulfurated exhaust gas. The measured value is transmitted over a signal line 73' to a control means 75. The measured value is compared to an input rated value and the difference, if any, is used to provide a control pulse which is transmitted over a control line 77 to control metered introduction of dust and/or raw meal into the chamber 37. Such metered introduction may be accomplished through the use of the Fuller-Kinyon pumps 69 and 70 shown in FIG. 2.

A measuring device 74 is provided in a conduit 72 leading from the lowest heat exchanger cyclone 5 to the kiln intake head 9 for measuring the SO$_3$ content in the hot meal. This measuring device transmits the measured value over a signal line 74' to a control device 76. The control device likewise compares the measured value to an input rated value and in the case of a difference provides a setting pulse which is transmitted by a control line 78 to the variable exhaust blower 41. Simple means are thus employed to create control loops which control both the branching of the process gas as well as the feed of dust and/or preheated raw meal according to the amount of the sulfur content sensed in the gas or material stream of the system, thus keeping the equilibrium of the sulfur balance constant.

Figure 2:
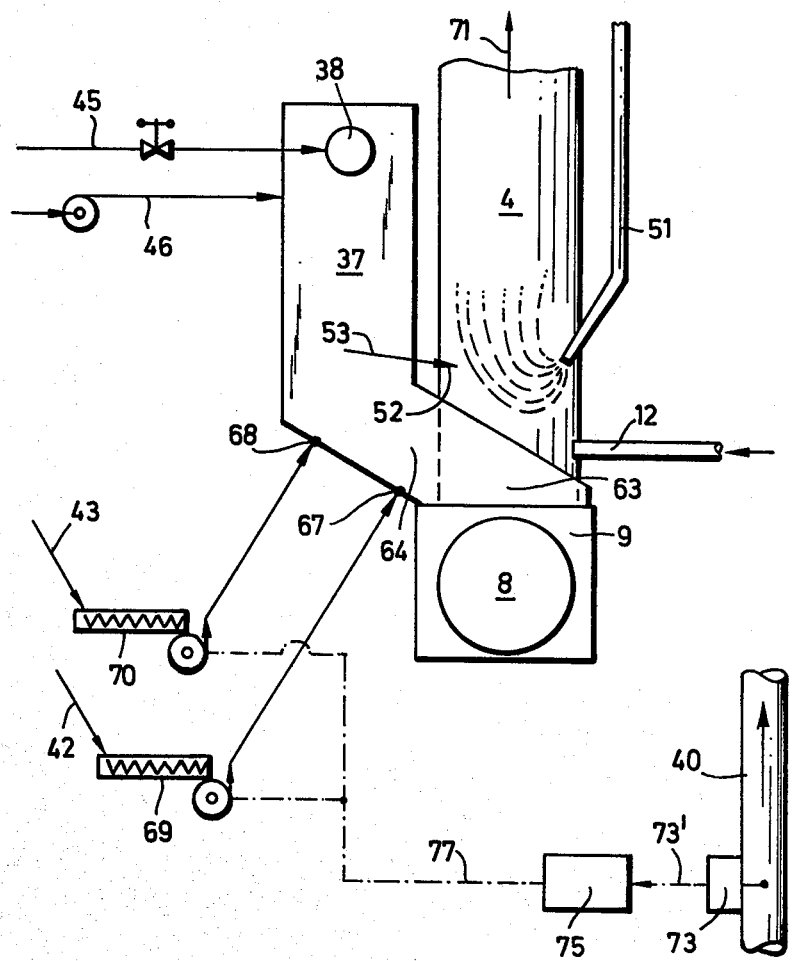
FIG. 2 is a view on a somewhat enlarged scale illustrating a rotary tubular kiln intake chamber with a reaction chamber connected thereto, also on a substantially schematic basis.

The arrangement of the chamber 37 can be seen in greater detail from FIG. 2. This Figure shows the rotary tubular kiln 8, the kiln intake head 9 and connected thereto, the reaction zone 4 which is traversed by hot process gas in the direction of arrow 71. Heated raw meal is introduced by means of a down pipe 51 from the lowest suspension type exchanger cyclone 6 into the reaction zone at approximately the same height as fuel is introduced by means of an input line 52 as indicated by the arrow 53. The chamber 37 with its exhaust gas line 38 is connected to the kiln intake head 9 on the gas side. Discharging into the chamber 37 are connectors 67 and 68 of the distribution devices 42 and 43. These are provided with metered distribution Fuller type pumps 69 and 70. The water injection device 45 used in conjunction with the gas conditioning device 44 and the device 46 for adding fresh air are also schematically indicated. A part of the gas conduit 40 shows the SO$_2$ measuring device 73 with the signal line 73', and the control device 75 with the control line 77 which is connected to the two Fuller type pumps 69 and 70 for the purpose of matering the amount.

In the operation of the complete system, a metered, sludge-like mixture of raw materials indicated by the arrow 54 is delivered into a dewatering means 21 and, after dewatering, is stored in the intermediate hopper 22. Dewatered material is withdrawn from the intermediate hopper 22 and is delivered by the conveying means 23 to the kneading mixer 24. Material which is still moist is mixed in the kneading mixer 24 with grit separated out in the sifter 27 and supplied through the line 28 where it is mixed by the kneading mixer 24 into a crumbly mass. This mass is delivered to the flow drier 26 or to a comminution and processing apparatus 25 which is integrated therewith and which loosens and disintegrates the crumbly agglomerate to a high degree. The material pretreated in this manner is further disintegrated in the rising airstream of the flow drier 26 and is thereby dried and separated in the sifter 27 into meal and grit. The finished material proceeds in the stream of warm air through the line 55 into the electric gas cleaning system 29 and is deposited therein at approximately 90% as raw meal in the chamber I, and is discharged by means of the line 32 into the raw material silo 33. From there, the raw meal proceeds over the Fuller type pump 34 and the conveying line 35 into the preheating and pre-calcining stage 1 of the calcining system 20 by means of the connecting line 36 which exists between the heat exchanger cyclone 7 and the cyclone dust separator group 3. The raw meal is preheated and is introduced by means of the down pipe 56 into the connecting line 57 between the heat exchanger cyclones 6 and 7. The material is further heated in the heat exchanger cyclone 7 and is then introduced through the down pipe 58 into the connecting line 59 between the heat exchanger cyclones 5 and 6. Finally the raw meal subjected to further preheating is separated from the heat exchanger cyclone 6 and is introduced through the down pipe 51 into the reaction zone 4 where it is calcined in the known manner with the addition of fuel. Calcined raw meal is introduced through the kiln intake head 9 into the rotary tubular kiln 8 in a direction opposite to the flowing gas stream and is calcined into clinker by means of further heat treatment up to about 1450° C. The hot gas produced in counter-flow relation to the raw meal by the burner 60 having a flame 61 flows in the direction of the arrow 62 to the kiln intake head 9 while emitting heat to the calcining material and flows from there into the reaction zone 4 and subsequently into the preheating and pre-calcining stage 1. A volume of gas provided by means of the adjustable blower 41 depending upon the control means 74, 74', 76 and 78 is suctioned in at a controlled rate and is withdrawn from the chamber 37 through the gas mixer 44 by means of the exhaust gas line 38', electric gas cleaning apparatus 39, and the exhaust gas line 38. A corresponding amount of gas flows through the connecting area 63 of the chamber 37 from the kiln intake head 9 and with a temperature range of approximately 1000° to 1300° C. prevailing, proceeds into the lower portion 64 of the chamber 37. The withdrawn gas sample is then mixed therein by means of supplying dust and/or raw meal so that a temperature favorable for the reaction of sulfur bonding occurs. The conveying and distribution of dust and/or raw meal is carried out by devices 42 and 43 through the conveying means 47 and 48 as well as with the assistance of the metering Fuller type pumps 69 and 70 based upon the control signals from the control means 75 passing over the control line 77.

Fine and super-fine dust in the size range between 5 and 20 microns is withdrawn from chambers II and III of the electric gas cleaning system 29 and delivered by means of the line 47 into the chamber 37 in the manner described above. The temperature of the dust products amounts to approximately 100° C. If necessary, a slight amount of raw meal can be added from the branch line 48 from the cyclone group 3. This meal has a temperature of approximately 300° to 400° C. In case the addition of a hotter raw meal should be required, a branch 65 is provided so that raw meal at approximately 700° C. can be supplied from the down pipe 51 to the conveying and distributing means 42. Fine dust recirculated from the electric gas cleaning apparatus 39 through the lines 50 and 43 can, if desired, be added to the mixture of raw meal and dust in the chamber 37. The majority of the fine dust, particularly that coming from the electric gas cleaning system 29, essentially consists of calcium carbonate and, under some conditions, magnesium carbonate. These materials are at least partially deacidified in the chamber 37 and to some extent in the exhaust gas line 38, the deacidification occurring at temperatures between 500° and 1000° C. whereby $CO_2$ is dissociated and $SO_2$ is bonded. The process gas is largely desulfurated by the time it passes through the exhaust gas line 38. The process gas with its sulfate components in fine grained form passes through the exhaust gas line 38 into the electric gas cleaning apparatus 39 wherein the desulfurated process gas is separated from the solids as exhaust gas. The gas proceeds over the exhaust gas line 38' and the blower 41 into the exhaust gas line 40 and is conducted back over the line 66 into the circulation system for the flow drier 26.

In the calcining system 20, the process gas diverted from the kiln intake head 9 is replaced in the reaction path by means of air from the cooler 11 which is heated to approximately 1000° C., this air being supplied through the tertiary air conduit 12 while bypassing the rotary tubular kiln 8. The concentration of sulfur dioxide in the area of the reaction path 4 consequently decreases. As described in detail previously, the creation of harmful sulfur circulations is thus prevented.

The system illustrated in the drawings is to be interpreted only as an example, and many modifications can be made thereto. For example, the disposition of the measuring locations for $SO_2$ and/or $SO_3$ measurements can be at other locations. The regulating and control elements can also be varied. Any other desired devices having similar functions can be employed instead of the particular conveyor and distributor elements shown. Finally, the connection and disposition of the main system parts such as suspension type prehater, the cyclones, the number of gas cleaning devices, and the like, are only schematically indicated and are subject to variation.

We claim as our invention:

1. A method for reducing the amount of sulfur compounds in circulation or $SO_2$ emissions or both in a system for calcining fine grained material in the manufacture of cement comprising, in sequence,
   preheating said fine grained material in at least one preheating stage,
   pre-calcining the preheated material in at least one pre-calcining stage to produce a meal containing $SO_3$,
   calcining and sintering the pre-calcined meal in a final sintering stage,
   withdrawing an exhaust gas containing $SO_2$ from said sintering stage,
   sensing the amount of $SO_2$ contained in said exhaust gas,
   mixing the withdrawn exhaust gas with a dust containing an alkaline earth compound capable of bonding sulfur in a reaction stage and reacting said gas with said dust in an amount determined by the amount of $SO_2$ sensed in said exhaust gas or the $SO_3$ content of said pre-calcined meal, or both,
   cooling the thus treated exhaust gas,
   separating the purified gas from the remaining sulfur containing solids, and
   at least partially recirculating the dust remaining from separation of the sulfur containing gases and sulfur containing solids back into said reactor stage.

2. A method according to claim 1 in which:
   at least a portion of the dust leaving said reaction stage is returned for further treatment in said reaction stage to thereby increase its dwell time in said reaction stage.

3. a method according to claim 1 which includes the step of:
   separating dust out of said system by multi-stage electrical precipitation to recover a fine dust in one of the latter stages having a grain size of up to 40 microns, and
   employing the dust thus recovered to react with said gas in said reaction stage.

4. A method according to claim 3 in which:
   said fine dust has a grain size of between 5 and 20 microns.

5. A method according to claim 1 which includes the step of:
   passing the purified gas into heat exchange relationship with the fine grained raw material to dry the same.

* * * * *